Nov. 14, 1950

C. P. POTTS 2,529,813

TIRE PRESSURE GAUGE

Filed Jan. 16, 1948

INVENTOR.
C. P. Potts
BY
Wilkinson & Mawhinney
Attorneys

Nov. 14, 1950   C. P. POTTS   2,529,813
TIRE PRESSURE GAUGE
Filed Jan. 16, 1948   2 Sheets-Sheet 2
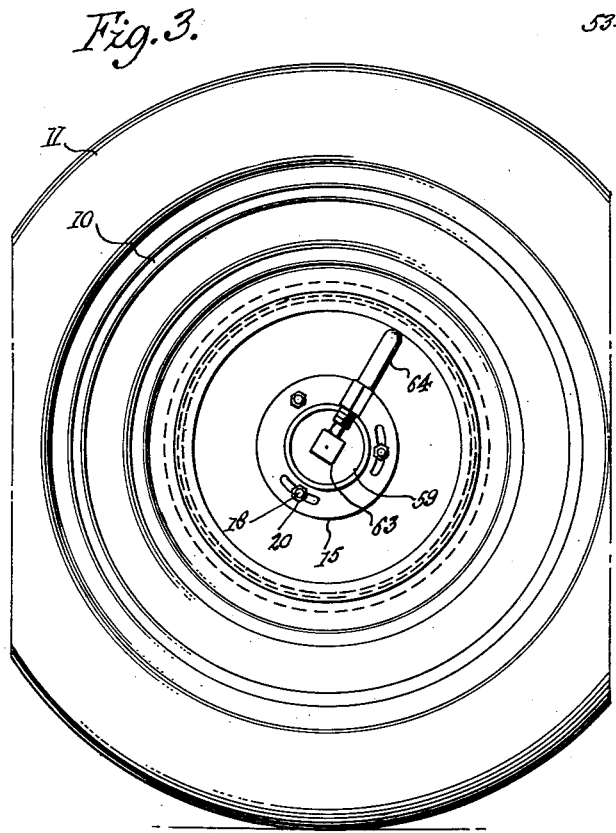
INVENTOR.
C. P. Potts
BY
Wilkinson & Mawhinney
Attorneys Patented Nov. 14, 1950

2,529,813

UNITED STATES PATENT OFFICE 2,529,813

TIRE PRESSURE GAUGE

Clarence Poe Potts, Macon, Ga., assignor to Safety Tire Gauge, Inc., Atlanta, Ga., a corporation of Georgia Application January 16, 1948, Serial No. 2,729

3 Claims. (Cl. 200—58)

The present invention relates to an improved Tire Pressure Gauge and more particularly to an improvement in the electric transmitter or pressure unit described in my U. S. Patent No. 2,230,906, granted February 3, 1941, covering a tire pressure indicator.

It is an object of the present invention to overcome the above noted disadvantages of the prior structures by providing an improved electric transmitter or pressure unit in which the point assembly or sender part of the transmitter is positively held against rotation.

Another object of the present invention is to provide an electric transmitter or pressure unit which is carried by the hub cap at substantially the center of the axis of rotation of the wheel so that centrifugal force will have a minimum effect on the transmitter.

A further object of the present invention is to provide an electric transmitter or pressure unit which is supported solely by the hub cap of the wheel of the vehicle and which is removable with the hub cap when separated from the wheel.

Other features of the present invention are that it will not interfere with the proper balance of the wheels of the vehicle, permits of easy installation of the unit, wheels may be quickly interchanged in the usual manner, and eliminates collector rings.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a plan view of a motor vehicle chassis, with parts broken away and parts shown in section, showing a tire pressure indicating system embodying the features of this invention;

Figure 3 is a fragmentary side elevational view taken from the inside of a wheel and tire with the improved tire pressure gauge mounted thereon;

Figure 4 is a vertical central sectional view taken on the line 4—4 of Figure 2;

Figure 5 is a transverse sectional view taken on the line 5—5 of Figure 2;

Figure 6 is a front elevational view of the improved transmitter or pressure unit with the cover removed.

Figure 1:
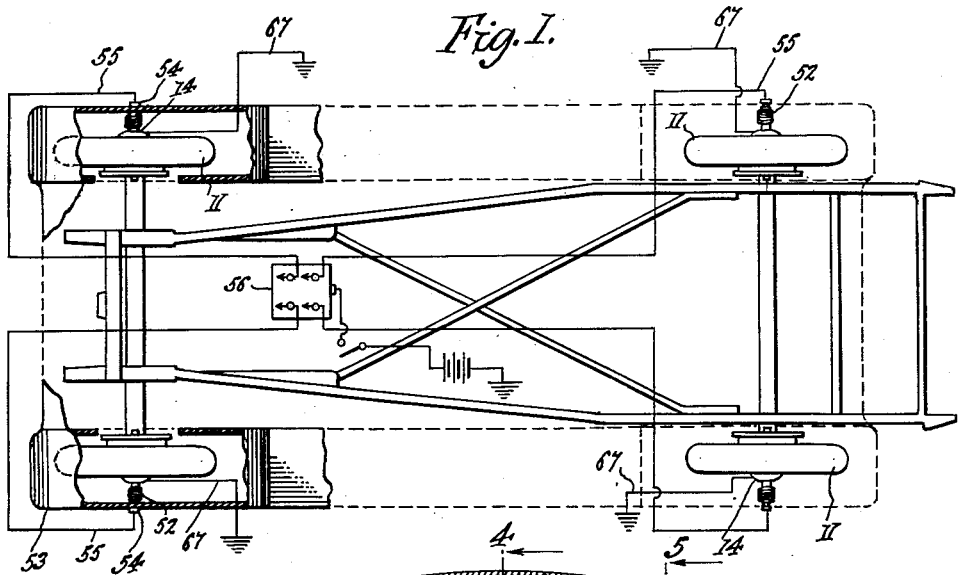
Figure 2:
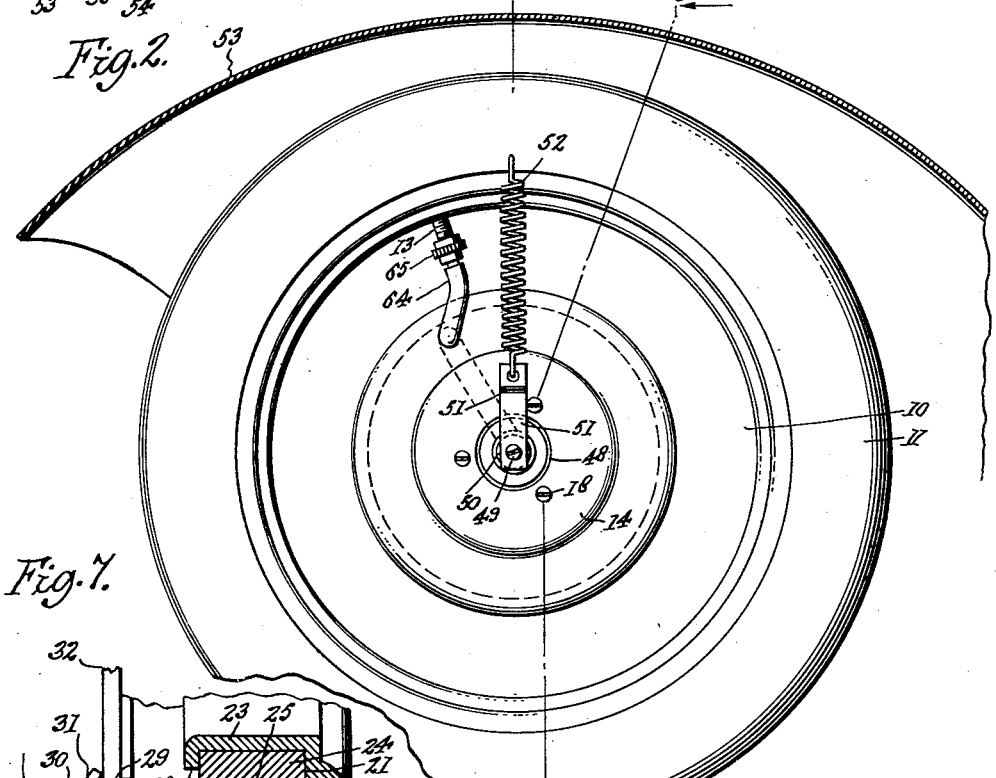
Figure 2 is a fragmentary side elevational view taken from the outside of a wheel, tire and fender with the improved tire pressure gauge mounted thereon.
Figure 7:
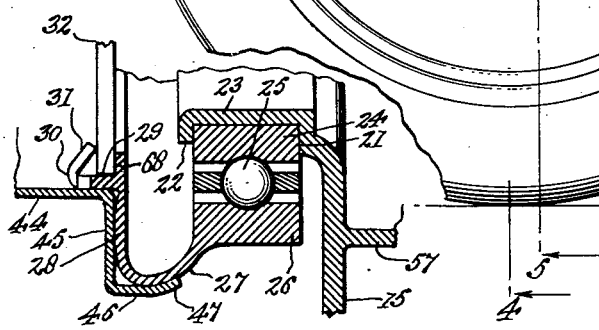
Figure 7 is a detail enlarged sectional view of the parts shown in Figure 4.

Referring to the drawings, 10 designates a wheel body of any suitable construction, such as sheet metal and which is provided in the usual manner with a pneumatic tire 11 in which is placed an inner tube 12 having a valve stem 13 projecting radially inward through the peripheral tire seat of the wheel body 10. A hub cap 14 is detachably mounted on the wheel body in the usual manner.

A rotatable ring 15 having a pair of circumferentially extending angularly spaced apart slots 16 and an opening 17 is supported by the hub cap 14 for rotation therewith by bolts 18 which are received by angularly spaced openings 19 in the hub cap and the slots 16 and opening 17 of the ring 15. Nuts 20 hold the bolts 18 in properly adjusted position.

The ring 15 has an annular shoulder 21 and lip 22 which provide therebetween a seat 23 for retaining an inner race 24 for ball bearings 25. A non-rotatable annular outer race 26 is provided for the ball bearings 25 and has formed integrally therewith an enlarged annulus 27 having an outer convex surface. The annulus is provided with an inwardly extending shoulder 28 from the inner end of which projects a rim 29 having mounted thereon three angularly spaced apart brackets 30, each of which carries a bendable lug 31. A mount plate 32 having notches 33 corresponding in number to that of the lugs 31 receives the brackets 30 and the lugs enter the notches 33 and are bent over to engage the amount plate for detachably securing it against an annular seat 68 on the annulus 27.

As shown in Figures 5 and 6, a flexible electric contact 34 is mounted upon the mount plate 32. This flexible contact 34 carries a plunger 35 which extends through and beyond the rotatable ring 15. A second flexible electric contact 36 is carried by the mount plate 32 and is adapted to be engaged by the flexible contact 34 to close an electric circuit. A bar 69 has one end attached to the mount plate 32 and its free end supports the second flexible contact 36. The contact is electrically insulated and separated from the bar 69 by means of an insulator or separator 32a. The contact 34 is positioned to be engaged by the plunger 35 and to thereby, upon the actuation of the plunger, drive the same to the left as best seen in Figure 5 to establish contact with the contact 42 thereby completing the electrical circuit. An adjustable toothed cam 70 is carried by the mount plate and engages the free end of the bar 69, the teeth being provided to facilitate the calibration of the sender and receiver in order to get the correct reading according to the pressure in the tire. Adjustment of the cam will move the flexible contact 36 towards or from the flexible contact 34 to regulate the distance the plunger 35 must travel to establish engagement between the contacts 34 and 36. It will therefore be seen that the adjustable cam 70 is used to calibrate the sender and receiver in order to obtain the correct reading according to the pressure in the inner tube 12. The second contact 36 is bi-metallic and is provided with a resistance coil 37 thereon which is included in the circuit closed by the contacts 34 and 36 so as to heat contact 36 and cause it to bend away from the contact 34 to break the circuit after the same has been closed for a period of time sufficient to warp or bend the contact 36 toward its open circuit position. The movement of the contact 36 away from the contact 34 is limited by a stop 38.

In order to reduce the effectiveness of the current through the instrument, a suitable resistance coil 39 is mounted in the circuit between a pair of spring clamps 40 and suitable insulation is provided between the parts to cause the circuit to travel therethrough as desired. A spring contact arm 41 bears against a contact 42 carried by a cover 43. The cover 43 has a cylindrical body portion 44 and an annular outturned shoulder 45 which is co-extensive and has abutting engagement with the shoulder 28 of the non-rotatable annulus 27. Extending from the outer edge of the shoulder 45 of the cover 43 is a skirt 46 which has frictional engagement with the non-rotatable annulus 27. An annular lip 47 extends inwardly from the free edge of the skirt 46 for engagement behind the annulus 27. The cover is preferably made of some inherently resilient material so that the skirt 46 and the lip 47 will snap into frictional engagement over the annulus 27 to bind the annulus 27 and its shoulder 28 between the shoulder 45 and the lip 47 of the cover 43 for locking the non-rotatable annulus and the cover together to prevent relative rotative movement thereof.

The hub cap 14 is provided with a centrally located opening 48 which is disposed at the horizontal axis of the hub cap. This opening 48 is of larger diameter than the outside diameter of the cover 43 so that when the cover is in place adjacent the opening 48 it is spaced from the wall of the opening 48 of the hub cap.

An electrical contact screw 49 having engagement with the contact 42 on the cover 43 is threadedly received by an insulation plug 50 which is fixedly secured in any suitable manner to the cover 43 and extends outwardly through the opening 48 in the hub cap. A flat metal electrical conductor 51 is frictionally secured to the insulation plug 50 by the screw 49 so that there is no relative rotative movement between the conductor and the cover 43. The conductor 51 extends upwardly a short distance and has secured to its upper end a coiled spring 52 which is made of some suitable electrical conducting material. The coiled spring 52 extends upwardly and has its upper end secured to a vehicle fender 53 by an insulating support 54. The end of the coiled spring which is secured to the fender is connected to a wire 55 which leads to an indicator mounted behind a suitable panel 56; the indicator and panel being of the type described in my above-mentioned U. S. Patent No. 2,230,906.

The rotatable ring 15 has an inwardly extending annular flange 57. A pressure chamber 58 is formed by a wall 59 having an inturned flange 60 to which is secured a diaphragm 61 by means of a band 62. The pressure chamber 58 is secured to the flange 57 of the rotatable ring 15 by the band 62. A nipple 63 communicates with the pressure chamber and is connected by a flexible tube or hose 64 to the valve stem 13 of the inner tube 12 by a coupling nut 65. The hose 64 is passed from the nipple 63 on the inner side of the hub cap through an opening 66 therein to the outer side of the hub cap.

In operation the inner tube 12 is inflated by the application of an air pressure hose to the valve stem 13. The pressure at all times is transmitted from the inner tube 12 to the diaphragm 61 by means of the flexible tube or hose 64. The air pressure when sufficiently great flexes the diaphragm 61 which moves the plunger 35 and its flexible contact 34 into engagement with the second flexible contact 36 to close the circuit through the heating coil 37. The circuit is grounded on the hub cap 14 through a wire 67, the plunger 35, the diaphragm 61, ring 15 and bolts 18. The pressure of the air in the inner tube is shown on an indicator on the panel 56 as described in my U. S. Patent No. 2,230,906. The heating coil then warps or bends the contact 36 out of engagement with the contact 34 and breaks the circuit.

When the vehicle is in motion the wheel body 10 and the hub cap 14 will rotate and the pressure chamber 58 and the rotatable ring 15 will rotate with the hub cap and the wheel body as they are secured to the hub cap and the wheel body. However, the remaining members of the pressure unit including the electrical contacts or point assembly will not rotate since they are not only directly secured to any rotating part of the wheel body or hub cap but are positively held against rotation by means of the cover 43 through its fixed connection with the coiled spring 52 which is secured to the fender 53 and its frictional non-rotative engagement with the annulus 27 which has fixed thereto the mount plate 32 with the electrical contacts fixed thereon.

Since the diameter of the axial opening 48 of the hub cap is greater than the outside diameter of the cover 43, the cover is spaced from the wall of the opening 48 and there is little or no tendency for the cover to pick up the rotative movement of the hub cap when the vehicle is in motion. The provision of the ball bearings 25 will permit the free rotation of the ring 15 and the pressure chamber 58 without imparting their rotative movement to the electrical contacts on the mount plate 32.

With such an arrangement there is very little, if any, centrifugal influence upon the electrical contacts through which the pressure readings are shown on the indicator so that aberrations in such readings which have been one of the great defects of prior devices are eliminated. The fact that the pressure unit is carried by the hub cap at a location which is co-incidental with the horizontal axis of rotation of the wheel body and hub cap also assists in eliminating the undesirable centrifugal influence on the device.

In order to remove the wheel body from the vehicle it is only necessary to disconnect the coupling nut 65 from the valve stem 13, remove the hub cap in the customary way and then remove the wheel body in the usual manner.

It is obvious that various changes and modifications may be made in the details of construction and design of the above specifically described embodiment of this invention without departing from the spirit thereof, such changes and modification being restricted only by the scope of the following claims.

What I claim is:

1. For use with a vehicle wheel body and a hub cap mounted on the wheel body, a tire pressure gauge comprising a rotatable member, means adapted to be attached to the hub cap for supporting said member for rotation with said hub cap, a non-rotatable member supported by said rotatable member, means for holding said non-rotatable member against rotation, said non-rotatable member having an annular seat and brackets provided with bendable lugs, a mount plate engaging said annular seat and having notches for receiving said brackets and lugs with the lugs bent over in engagement with the mount plate for detachably securing it to the non-rotatable member, and a gauge unit carried by the amount plate.

2. For use with a vehicle wheel body having a valved tire thereon and a hub cap mounted on the wheel body, a tire pressure gauge comprising a rotatable member, means adapted to be attached to the hub cap for supporting said member for rotation with said hub cap, a non-rotatable member supported by said rotatable member, means for holding said non-rotatable member against rotation, an electrical contact assembly supported by the non-rotatable member and including a flexible contact, a plunger carried by said flexible contact and a second flexible contact adapted to be engaged by the first flexible contact, means carried by the rotatable member and actuated by the pressure in the tire for moving said plunger and first flexible contact into engagement with the second flexible contact, and an adjustable cam carried by the non-rotatable member for adjusting the position of the second flexible contact towards and from the first flexible contact.

3. For use with a vehicle wheel body and a hub cap mounted on the wheel body, a tire pressure gauge comprising a rotatable member, means adapted to be attached to the hub cap for supporting said member for rotation with said hub cap, a non-rotatable member supported by said rotatable member, means for holding said non-rotatable member against rotation, said non-rotatable member having an annular seat and brackets provided with gripping and retaining means, a mount plate engaging said annular seat and having notches for receiving said brackets and lugs with the lugs bent over in engagement with the mount plate for detachably securing it to the non-rotatable member, and a gauge unit carried by the mount plate.

CLARENCE POE POTTS.

REFERENCES CITED

The following references are of record in the file of this patent:

UNITED STATES PATENTS

| Number | Name | Date |
|---|---|---|
| 1,652,733 | Rouch et al. | Dec. 13, 1927 |
| 2,056,064 | Fenton | Sept. 29, 1936 |
| 2,230,906 | Potts | Feb. 4, 1941 |
| 2,258,384 | Harrington | Oct. 7, 1944 |
| 2,451,412 | Richbourg | Oct. 12, 1948 |